(No Model.)
N. FINCK.
MANUFACTURE OF SCISSORS.
No. 255,156. Patented Mar. 21, 1882.
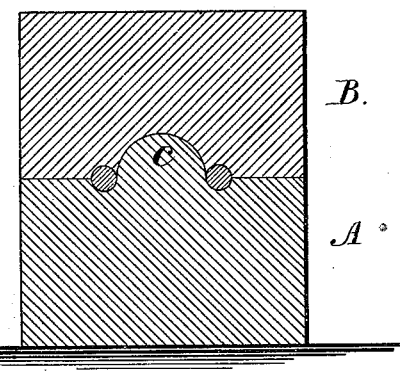
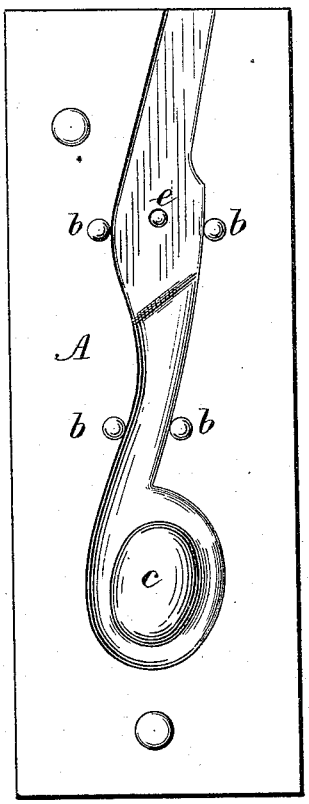
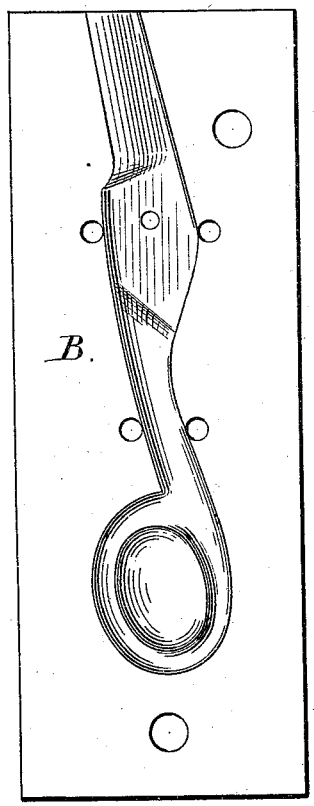
Witnesses
Chas H Smith
J. Hail
Inventor
Nicholas Finck.
per Lemuel W. Serrell
atty

UNITED STATES PATENT OFFICE.

NICHOLAS FINCK, OF ELIZABETH, NEW JERSEY.

MANUFACTURE OF SCISSORS.

SPECIFICATION forming part of Letters Patent No. 255,156, dated March 21, 1882.

Application filed July 25, 1881. (No model.)

*To all whom it may concern:*

Be it known that I, NICHOLAS FINCK, of Elizabeth, in the county of Union and State of New Jersey, have invented an Improvement in the Manufacture of Shears and Scissors, of which the following is a specification.

In the manufacture of scissors and shears it is usual to make the handles and the bodies of the blades of malleable cast-iron, and then weld upon the same the steel surfaces for the blades. In doing this the handles become very soft and porous by the heating operations. When the shears are ground and polished there is considerable time lost in bending the handles to the proper positions relatively to the blades, because they have become warped and distorted by the heat in the welding as well as while being rendered malleable. In this bending operation the handles are often broken, and thus there occurs loss of material as well as time.

My improvement in the manufacture is made for rendering the handles dense and smooth, and at the same time making the handle true and properly shaped in respect to the blade. I accomplish this object by dies that are adapted to receive the parts of the shears or scissors after the steel has been welded to the malleable iron, and submit the parts to a powerful pressure, that consolidates and hardens the malleable cast-iron, so that it is stronger and stiffer than heretofore. At the same time the blade and handle are made true and in proper relative shape, and the subsequent bending and risk of injury are avoided, and the surfaces of the malleable cast-iron, which otherwise would be rough, are rendered smooth, so that little or no subsequent filing is required, especially in cases where the handles are japanned, and each half of the shear, being properly shaped, can be ground up and finished before the two halves are put together, whereas in the ordinary manufacture of shears the parts have to be kept, so that the two halves that are intended to form the shear will be connected or else laid together in the subsequent grinding and finishing operations.

In the drawings, Figure 1 is a plan of the bed-die; Fig. 2, an inverted plan of the upper die; and Fig. 3 is a section of the two dies at the line $x\ x$.

The die A has a recessed surface of the size and shape corresponding to one-half of the shear. It may include the whole of the blade or only a portion of the same sufficient to bring the handle properly into line with the blade. There are to be guide-pins $b\ b$ at different places around the recesses in the surface of the die to insure the proper position of the shear-blank when laid upon the die. I prefer to use a projection upon the die A at $c$ to pass into the handle, and a pin at $e$ for the screw-hole. The die B is recessed to correspond with the handle and the whole or a portion of the blade. When the shear-blank is laid on the die A and the die B brought down on the same, either by a drop or powerful press, the handle is straightened and bent to shape where necessary, and the metal consolidated and the surfaces smoothed, as aforesaid.

It is to be understood that a proper pair of dies is to be made for each half-shear; but, if desired, one pair of dies may have two sets of recesses to receive the two halves of the shear or scissors between them.

I do not claim guide-pins to insure the proper position of one die in relation to the other, as these devices are well known. In my improvement the pins that are inserted in the die insure the proper position of the handle to the recess in the die, and, if necessary, aid in bending the handle before the pressure is given by the dies themselves.

I claim as my invention—

1. The herein-described improved method of manufacturing scissors or shears, consisting in casting the handles of iron and rendering them malleable, preparing the steel blades in the usual manner, welding the steel blades to the malleable-iron handles by hammers or dies acting upon the parts that are welded together, and then subjecting each handle and blade, when cold, to a powerful pressure between dies that act upon the malleable-iron portion to consolidate the metal, smooth the surface, and remove any imperfections in the shape, substantially as set forth.

2. The dies A and B, having recesses corresponding to the shear or scissor handle and blade, in combination with the pins $b$, placed around the edges of the recessed portion of one die to guide the handle of the shear into the recess, the other die having openings for the said pins to pass into, substantially as set forth.

Signed by me this 19th day of July, A. D. 1881.

NICHOLAS FINCK.

Witnesses:
HENRY J. STRATEMEYER, Jr.,
T. R. PRICE.